United States Patent [19]

Rits

[11] Patent Number: 5,515,067
[45] Date of Patent: May 7, 1996

[54] SELF-SUPPORTING SHELL FOR USE IN SPACE

[75] Inventor: Willy J. Rits, Katwijk, Netherlands

[73] Assignee: Agence Spatiale Europenne, Paris, France

[21] Appl. No.: 373,891

[22] Filed: Jan. 17, 1995

Related U.S. Application Data

[63] Continuation of Ser. No. 35,315, Mar. 22, 1993, abandoned.

[30] Foreign Application Priority Data

Mar. 24, 1992 [FR] France .................. 92 03506

[51] Int. Cl.[6] .......................... H01Q 15/14; H01Q 15/20
[52] U.S. Cl. .................. 343/912; 343/915; 135/29; 135/31
[58] Field of Search .................. 343/912, 914, 343/915, 916, DIG. 2; 135/25.33, 25.34, 26, 29, 31, 33.2, 33.5, 33.6; H01Q 15/14, 15/20

[56] References Cited

U.S. PATENT DOCUMENTS

| 1,616,276 | 2/1927 | Orsik | 135/31 |
|---|---|---|---|
| 2,543,359 | 2/1951 | Frost | 135/33.5 |
| 2,551,297 | 5/1951 | Sherman | 135/33.5 |
| 2,674,693 | 4/1954 | Millett et al. | 343/915 |
| 3,360,798 | 12/1967 | Webb | 343/915 |
| 3,521,290 | 7/1970 | Babhnan et al. | 343/915 |
| 3,541,569 | 11/1970 | Berks et al. | 343/915 |
| 3,558,219 | 1/1971 | Buckingham et al. | 350/292 |
| 3,579,244 | 5/1971 | Dempsey | 343/915 |
| 3,844,301 | 10/1974 | Harrell | 135/20 R |
| 4,947,825 | 8/1990 | Moriarty | 126/439 |
| 5,188,137 | 2/1993 | Simonelli | 135/26 |

FOREIGN PATENT DOCUMENTS

| 2587548 | 3/1987 | France . | |
| 60-178706 | 9/1985 | Japan | 343/915 |
| 62-49709 | 3/1987 | Japan | H01Q 15/20 |
| WO9003310 | 4/1990 | WIPO . | |

*Primary Examiner*—Donald T. Hajec
*Assistant Examiner*—Hoanganh Le
*Attorney, Agent, or Firm*—Sughrue, Mion, Zinn, Macpeak & Seas

[57] ABSTRACT

A foldable self-supporting vaulted shell for use in space, the shell comprising a thin flexible membrane and a plurality of thin battens forming ribs for tensioning said membrane. Each of the battens has a first main face and a second main face, one of the main faces facing the membrane. The membrane includes guide pocket for said battens. The guide pocket terminating at at least one end by abutment-forming end-reception means for receiving corresponding ends of the battens, and forming abutments such that in a deployed condition, the ends of the battens transmit axial force to the membrane. As a result tensioning of the membrane occurs. The shell occupies a small volume in its folded condition for storage in a launcher for the purpose of being placed into orbit. Such a shell is suitable for making microwave antennas. The invention also relates to a method of packaging such a shell.

15 Claims, 3 Drawing Sheets

SELF-SUPPORTING SHELL FOR USE IN SPACE

This is a continuation of application No. 08/035,315, filed Mar. 22, 1993, now abandoned.

The invention relates to a self-supporting shell for use in space, in particular a type constituting a reflector, and also to a method of packaging it.

BACKGROUND OF THE INVENTION

To communicate between one another and/or with a terrestrial station, satellites use microwave beams that are formed and received by means of antennas that include reflectors of large size. Efficient focusing of the telecommunications beam is obtained solely by reflection on a surface of the reflector whose deviations from a desired ideal surface are small relative to the wavelengths used. A deviation of a part of the real surface of the reflector from the ideal surface (e.g. a paraboloid of revolution) gives rise to a phase shift in the signal reflected by that region in comparison with the signal that would have been reflected by the ideal surface.

Firstly, forming of a narrow beam and/or reception of a maximum amount of energy from a beam requires antennas of large aperture.

Secondly, placing a satellite and its antenna into orbit is facilitated by the antenna reflector being compact when in a folded condition during launch, and also by the reflector being low in mass.

Various solutions have been proposed for making such reflectors, and in particular reflectors that include a reflecting membrane tensioned over a frame.

None of the reflectors presently in service or proposed provides satisfaction simultaneously on all of the points mentioned above.

OBJECTS AND BRIEF SUMMARY OF THE INVENTION

Consequently, an object of the present invention is to provide a self-supporting shell capable of constituting a highly accurate reflector.

Another object of the invention is to provide such a shell, in particular a reflector of large size.

Another object of the present invention is to provide a shell, in particular such a reflector that has a high degree of dimensional stability over a prolonged period in space.

Another object of the present invention is to provide a shell that occupies a small volume when folded.

Another object of the invention is to provide a shell, in particular a reflector of small mass.

Another object of the present invention is to provide a shell, in particular a reflector provided with a reliable deployment mechanism.

Another object of the present invention is to provide a shell, in particular a reflector provided with a deployment mechanism of small mass.

Another object of the present invention is to provide such a shell, in particular a reflector, whose proper operation can be verified from the Earth.

According to the invention, these objects are achieved by using a vaulted membrane tensioned by a frame including battens, one of the main faces of each batten following the curvature of the membrane. At least one of the ends of each batten comes into abutment on reception means formed on the membrane.

The present invention provides a foldable self-supporting vaulted shell for use in space, the shell comprising a thin flexible membrane and a plurality of thin battens forming ribs for tensioning the membrane. Each of the battens has a first main face and a second main face, one of the main faces facing the membrane. The membrane includes guide means for the battens, the guide means terminating at at least one end by abutment-forming end-reception means for receiving corresponding ends of said battens. Forming abutments are provided such that in a deployed condition, ends of the battens transmit an axial force to the membrane, thereby tensioning the membrane. The shell occupies a small volume in its folded condition for storage in a launcher for the purpose of being placed into orbit.

The present invention also provides a shell in which the battens, when in the deployed condition, follow the curvature of the membrane.

The present invention also provides a shell in which the battens are curved having a substantially C-shaped cross-section.

The present invention also provides a shell in which the battens are made of a metal alloy that is highly elastic, preferably a beryllium-copper alloy.

The present invention also provides a shell in which the means for receiving the end of a batten and forming an abutment therefor are disposed at the periphery of the shell.

The present invention also provides a shell in which the very thin flexible membrane is constituted by a sheet of plastic, preferably a sheet of the material sold under the name Kapton by DuPont de Nemours, and reinforced by fibers, preferably fibers sold under the trademark Kevlar by DuPont de Nemours.

The present invention also provides a shell in which the membrane includes a thin metal coating suitable for reflecting electromagnetic radiations, in particular infrared light, visible light, ultraviolet light and/or microwaves.

The present invention also provides a shell that is substantially in the form of a paraboloid of revolution when in the deployed condition.

The present invention also provides a shell including a hub having actuators for exerting axial tension on the end of each of the battens that is opposite to its end that bears against the abutment-forming end-reception means.

The present invention also provides a shell in which the actuators are springs disposed radially and bearing against pieces secured to one end of each of said battens.

The present invention also provides a shell in which in the folded condition, the battens are folded to form hinges along straight lines perpendicular to the axes of the battens.

The present invention also provides a shell in which, in the folded condition, the battens are rolled up.

The present invention also provides a shell in which the membrane includes batten guide means enabling the battens to slide radially relative to said membrane.

The present invention also provides a method of packaging a shell of the invention in a folded condition, the method including a step, on Earth, of putting said shell into its deployed condition, in folding the assembly constituted by the membrane and the associated battens so that the battens are folded orthogonally to their axes so as to form substantially plane hinges, and in which the battens store potential energy that can be released, at least in part, during deployment of said shell.

BRIEF DESCRIPTION OF THE DRAWINGS

The invention will be better understood from the following description of the accompanying drawings given as non-limiting examples, in which:

In FIGS. 1 to 7, the same references are used for designating the same items.

MORE DETAILED DESCRIPTION

Figure 1:
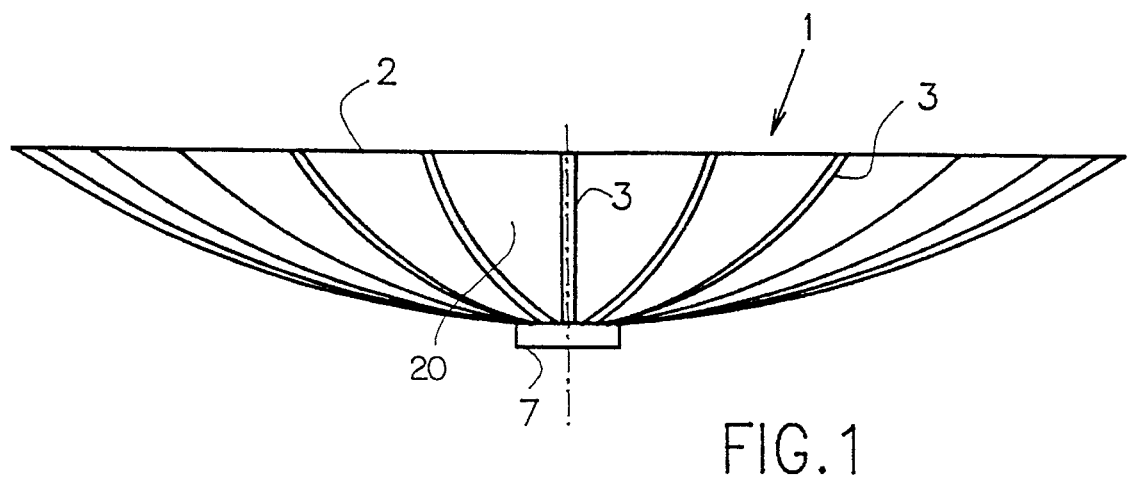
FIG. 1 is a side view of the preferred embodiment of a shell of the present invention.
Figure 4:
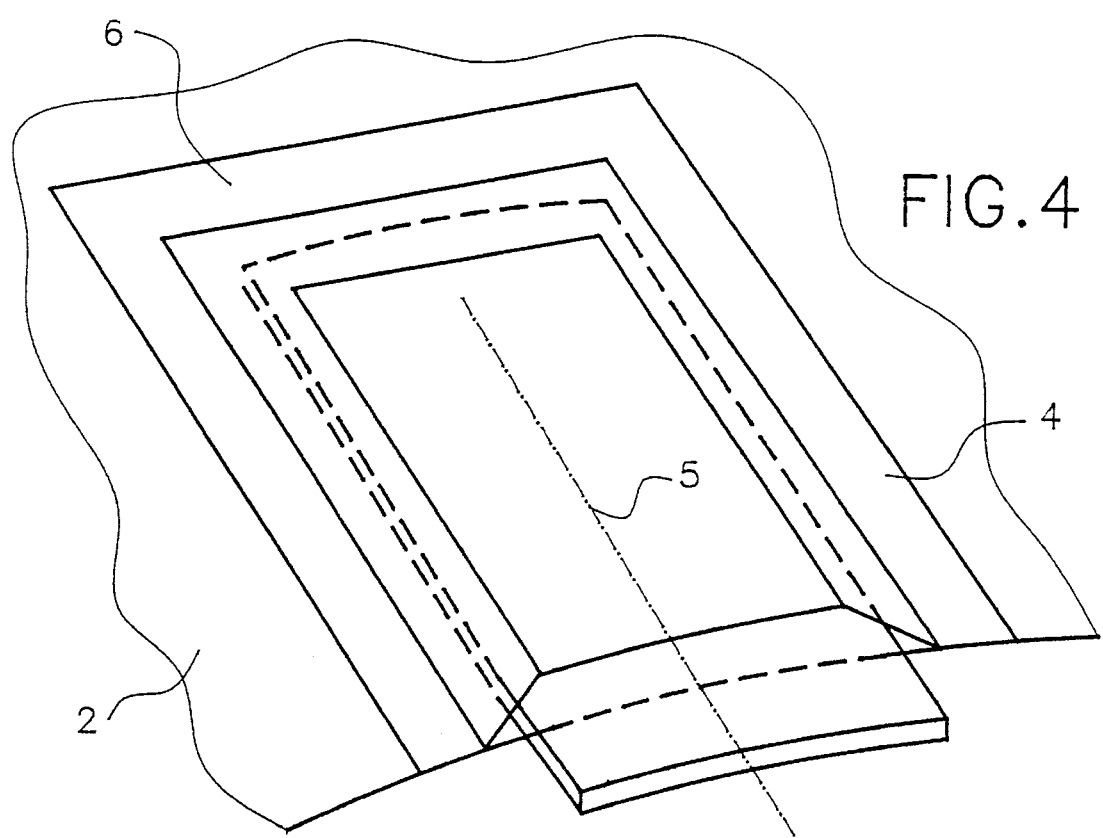
FIG. 4 is a perspective view of a detail of the shell of FIG. 1.

FIG. 1 illustrates an example of a shell 1 of the invention that constitutes a microwave reflector for a telecommunications antenna on a satellite (not shown). The shell of FIG. 1 is a paraboloid of revolution formed by a membrane 2 tensioned over a frame formed by battens 3 slidably mounted along respective batten axes 5 (FIG. 4) in radial guide means, e.g. in pockets 4 formed between the membrane 2 and a membrane which is advantageously of the same kind and which is fixed thereto by thermal welding or by gluing, for example. Advantageously, the pockets 4 are formed on the outside face of the shell 1 so as to minimize deformation of the metal-coated inside surface of the membrane 1 relative to the desired paraboloid of the revolution. To minimize weight, the membrane 2 is advantageously made of a material which has very great mechanical strength and which is metal coated to 20 make it reflective. For example, it is possible to use a sheet of the plastic sold under the name Kapton by DuPont de Nemours, and reinforced by aramid fibers, e.g. those sold under the trademark Kevlar by DuPont de Nemours. Excellent tensile strength in all directions associated with very low bending stiffness can thus be obtained. In the deployed condition, the ends of the ribs 3 exert a force parallel to their axes 5 on the abutments 6, which are advantageously placed at the periphery of the shell 1. The abutments 6 may be constituted, for example, by reinforced ends in the pockets 4 that contain the battens 3.

In one embodiment (FIG. 4), the battens 3 are slightly longer than the pockets 4.

Figure 5:
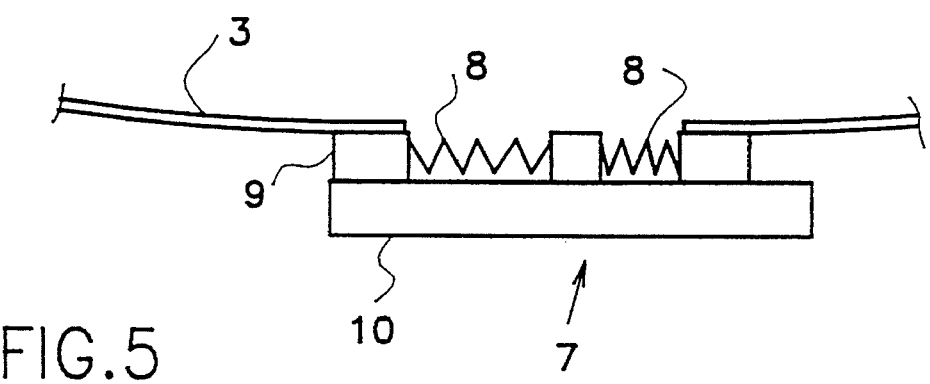
FIG. 5 is a diagram for explaining the deployment of the shell shown in FIG. 1.

In an advantageous second embodiment shown in FIG. 5 the reflector 1 includes a hub 7 including actuators located at the ends of the battens 3. For example, the actuators include springs 8 disposed axially and exerting force on pieces 9 secured to the ends of the battens 3 and guided radially by guides 10, e.g. rails. The hub 7 advantageously constitutes means for fixing and/or pointing the reflector 1 relative to the remainder of the satellite. In addition, it advantageously constitutes a support for radio equipment, e.g. a horn placed at the focus of the reflector.

Figure 2:
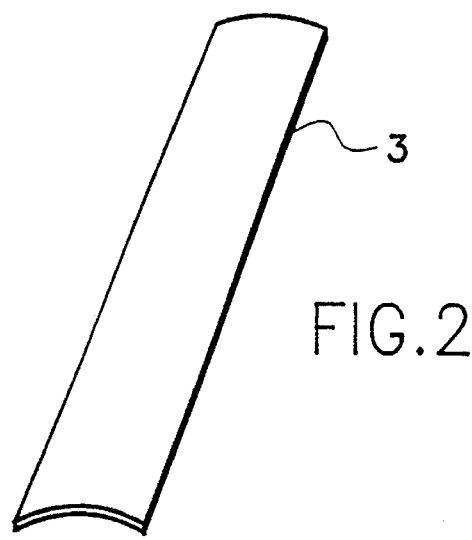
FIG. 2 is a perspective view of a particularly effective example of a batten suitable for being implemented in a shell of the present invention.

Advantageously, the battens 3 are curved, i.e. they have a section that is generally C-shaped, as can be seen in FIG. 2. Advantageously, the radius of curvature of a batten corresponds to the radius of curvature of the shell 1, e.g. halfway therealong. Thus, if the battens 3 are placed on the outside of the membrane 2, it is advantageous for the main concave faces thereof to be adjacent to the membrane 2.

For certain shapes of reflector 1, it is advantageous to use battens 3 whose curvature varies with length. For example, the curvature may be much more marked towards the center of a reflector than near its periphery.

Figure 3:
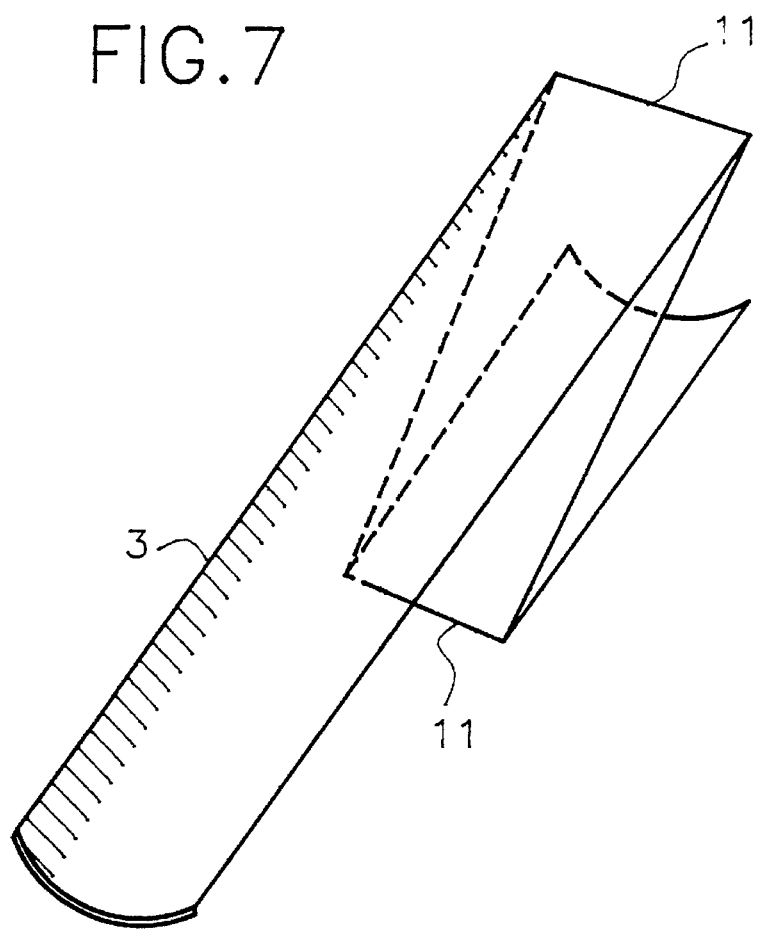
FIG. 3 is a perspective view of a partially-folded batten.

The curvature of the battens 3 makes it possible to obtain bending stiffness that varies as a function of the force exerted. Up to a threshold, the curved battens 3 behave like beams. If the bending moment threshold is exceeded, then the battens 3 flatten as shown in FIG. 3. The bending stiffness of the batten is then reduced by a factor of 100 to 400. It is thus possible to obtain desired stiffness by using curved battens that are thin (e.g. 0.1 mm thick), and that therefore have a low mass. This makes it possible to fold a batten 3, which on being bent forms flat hinges 11. The battens 3 are advantageously made of a metal alloy that is highly elastic, e.g. a beryllium-copper alloy. Prior to launching the reflector into orbit, it is thus possible to fold the reflector comprising the membrane 2 and the battens 3 so as to reduce the volume it occupies very considerably. As can be seen in FIG. 3, batten 3 returns progressively to its curved shape on moving away from hinge 11. However, using battens that retain a substantially plane shape once folded, would not go beyond the scope of the present invention.

Similarly, it is possible to reduce volume in the folded condition by rolling up the shell constituted by the membrane 2 and the battens 3. Each batten 3 then takes up a generally spiral shape.

Naturally, it is possible both to fold and to roll up the reflector 1 simultaneously so as to achieve the smallest volume compatible with storage and the ability to be deployed once in orbit.

It should be observed that in their folded condition (bent over and/or rolled up) the battens 3 store potential energy. This energy is used to deploy the reflector. Deployment is triggered by releasing the folded reflector from its container (not shown). Such release is advantageously obtained by explosive means, e.g. as described in French patent application No. 90 13706, filed in the name of the present Assignee.

Once the reflector has been released from its container, the energy stored in the battens 3 ensures that they are deployed, particularly at the hinges 11. The battens 3 return to their C-shaped section. Once the battens 3 and the membrane 2 have been deployed, the situation shown in the righthand half of FIG. 5 is achieved. The actuators 8 situated in the hub 7 then cause the battens 3 to be expanded radially. For example, each batten 3 may be secured to a thrust piece 9 which is guided in radial translation by guides 10 of the hub 7. The springs 8 disposed between the central portion of the hub 7 and the thrust pieces 9 enable the battens 3 to be extended radially, such that their opposite ends bear axially against the abutments 6, thus tensioning the membrane 2 so that its shape becomes a highly accurate approximation to the desired ideal shape, e.g. that of a paraboloid of revolution in the example shown in FIG. 1. A relaxed spring 8 corresponding to a tensioned membrane 2 can be seen in the lefthand half of FIG. 5.

The present invention is naturally not limited to its application as a reflector for a telecommunications antenna, and it may be applied to any shell in space that is large in size and that is required to withstand small forces only. In particular the walls of non-pressurized space hangars, reflectors for solar furnaces or solar energy concentrators, solar-wind sails, or reflective screens for providing protection against solar radiation are examples of other structures.

Figure 6:
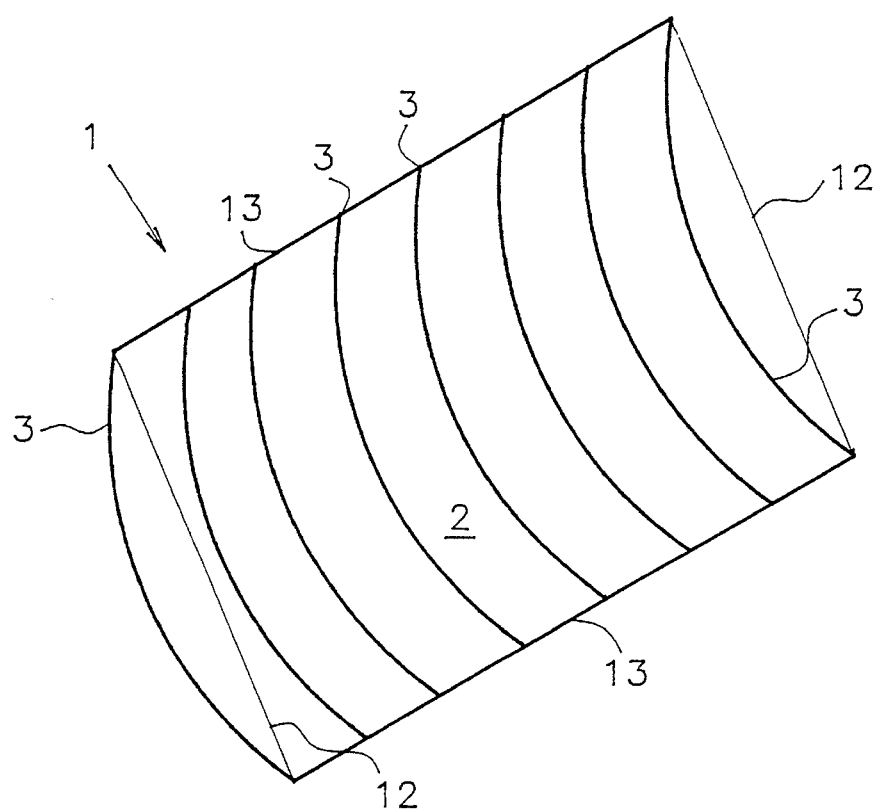
FIG. 6 is a perspective view of an embodiment of a shell of the present invention in the form of a portion of a cylinder.

FIG. 6 shows an example of the shell 1 of the present invention which takes up the form of a cylindrical surface. The batten 3 formed regularly spaced-apart circular arcs along the surface of the shell. At the two ends of the shell 1 shown in FIG. 6, there are respective cables 12 that embody the chords of the arcs formed by the first and the last battens 3. Advantageously, the ends of the battens 3 on each of the sides of the shell 1 are connected together by a stiffener member 13, e.g. a beam or an inflatable tube.

Figure 7:
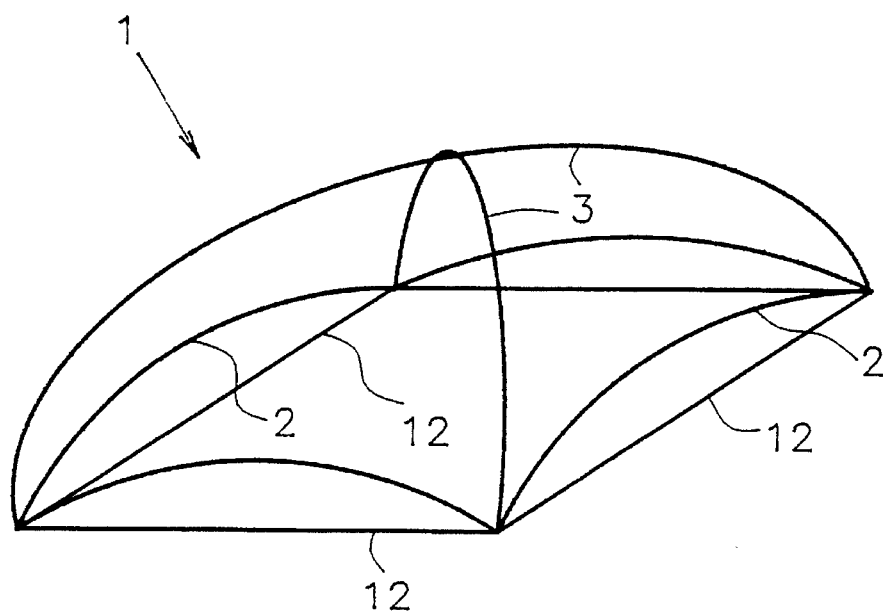
FIG. 7 is a perspective view of a shell of the present invention in the form of a vault.

FIG. 7 shows a another embodiment of the shell 1 of the present invention which is in the form of a Saxon or Norman vault on a base that is substantially square or rectangular. A membrane 2 is tensioned over two battens 3 that intersect at the apex, e.g. at an angle substantially equal to 90°. Each batten 3 is of sufficient length to ensure that when thermal equilibrium is established it tensions the membrane 2. The battens 3 are arched by the membrane 2 or, advantageously, by means of cables 12 interconnecting the ends of the battens 3. In the example shown, the cables 12 form the sides of a square or of a rectangle, whose corners are constituted by the ends of the battens 3. In a variant (not shown) the opposite ends of each batten are interconnected by a receptive cable.

The shell 1 of FIG. 7 is particularly well adapted to protecting a payload in orbit against solar radiation, or for providing a solar sail.

The shell 1 of FIG. 6 is particularly well adapted to focusing solar radiation on an elongate body for the purpose of performing experiments or of producing mechanical and/or electrical energy by means of a machine or turbine driven by vapor, the elongate body on which the shell 1 focuses solar radiation acting as a hot source while the cold source is constituted, for example, by a radiator which is protected from solar radiation, e.g. by the shell 1.

Naturally, other shell shapes, e.g. hyperboloids of revolution or hemispheres, do not go beyond the scope of the present invention.

In a variant embodiment, a reflector of large dimensions includes a rigid central element of very great accuracy surrounded and radially extended by a shell of the present invention. Such a reflector is particularly advantageous for use in implementing an antenna for a space radio-telescope.

I claim:

1. A foldable self-supporting vaulted shell for use in space, the shell comprising; a thin flexible membrane comprising a thin metal coating suitable for reflecting electromagnetic radiations and a plurality of thin battens forming ribs for tensioning said membrane, each of said battens having a first main face and a second main face, one of said main faces facing said membrane, said battens being flexible in a direction perpendicular to its main faces, said membrane including guide means for said battens, said battens slidably mounted in said guide means, said guide means terminating at at least one end by abutment-forming end-reception means for receiving corresponding ends of said battens, and forming abutments such that in a deployed condition, said ends of said battens transmit axial force to said membrane, thereby tensioning said membrane, said shell occupying a small volume in its folded condition for storage in a launcher for the purpose of being placed into orbit in which said battens store more potential energy than in the deployed condition.

2. A shell according to claim 1, in which said battens, when in the deployed condition, follow the curvature of said membrane.

3. A shell according to claim 1, in which said battens are curved having a substantially C-shaped cross-section.

4. A shell according to claim 1, in which said battens are made of a metal alloy that is highly elastic.

5. A shell according to claim 1, in which said abutment-forming end-reception means are disposed at the periphery of said shell.

6. A shell according to claim 1, in which said very thin flexible membrane is constituted by a sheet of plastic.

7. A shell according to claim 1, which is substantially in the form of a paraboloid of revolution when in the deployed condition.

8. A shell according to claim 1, including a hub having actuators for exerting axial tension on that end of each of said battens that is opposite to its end that bears against said abutment-forming end-reception means.

9. A shell according to claim 8, in which the actuators are springs disposed radially and bearing against pieces secured to one end of each of said battens.

10. A shell according to claim 1, in which said guide means enable the battens to slide radially relative to said membrane.

11. A method of packaging a shell in a folded condition, the shell comprising a thin flexible membrane comprising a thin metal coating suitable for reflecting electromagnetic radiations and a plurality of thin battens forming ribs for tensioning said membrane, each of said battens having a first main face and second main face, one of said main faces facing said membrane, said membrane including guide means for said battens, said battens are slidably mounted in said guide means, said guide means terminating at least one end by abutment-forming end-reception means for receiving corresponding ends of said battens, and forming abutments such that in a deployed condition, said ends of said battens transmit axial force to said membrane, the method including a step, on earth, of putting said shell into its deployed condition, in folding the assembly constituted by said membrane and said associated battens so that said battens are folded orthogonally to their axes so as to form substantially plane hinges, and in which said battens store potential energy that can be released, at least in part, during deployment of said shell.

12. A method according to claim 11, wherein said battens are made of a beryllium-copper alloy.

13. A foldable self-supporting vaulted shell for use in space, the shell comprising; a thin flexible membrane comprising a thin metal coating suitable for reflecting electromagnetic radiations and a plurality of thin battens forming ribs for tensioning said membrane, each of said battens having a first main face and a second main face, one of said main faces facing said membrane, said battens being flexible in a direction perpendicular to its main faces, said membrane including guide means for said battens, said battens slidably mounted in said guide means, said guide means terminating at at least one end by abutment-forming end-reception means for receiving corresponding ends of said battens, and forming abutments such that in a deployed condition, said ends of said battens transmit axial force to said membrane, thereby tensioning said membrane, said shell occupying a small volume in its folded condition for storage in a launcher for the purpose of being placed into orbit in which said battens are folded to form hinges along straight lines perpendicular to axes of the battens and store more potential energy than in the deployed condition.

14. A foldable self-supporting vaulted shell for use in space, the shell comprising; a thin flexible membrane comprising a thin metal coating suitable for reflecting electromagnetic radiations and a plurality of thin battens forming ribs for tensioning said membrane, each of said battens having a first main face and second main face, one of said main faces facing said membrane, said battens being flexible in a direction perpendicular to its main faces, said membrane including guide means for said battens, said battens slidably mounted in said guide means, said guide means terminating at at least one end by abutment-forming end-reception means for receiving corresponding ends of said battens, and forming abutments such that in a deployed condition, said ends of said battens transmit axial force to said membrane, thereby tensioning said membrane, said shell occupying a small volume in its folded condition for storage in a launcher for the purpose of being placed into orbit in which said battens are rolled up and store more potential energy than in the deployed condition.

15. A reflector for a satellite antenna for use in space, the reflector comprising;

a thin flexible membrane comprising a thin metal coating suitable for reflecting electromagnetic radiations, a plurality of thin battens forming ribs for tensioning said membrane, each of said battens having a first main face and a second main face, one of said main faces facing said membrane, said batten being flexible in a direction perpendicular to its main faces, said membrane including guide means for said battens, said battens slidably mounted in said guide means, said guide means terminating at least one end by abutment-forming end-reception means for receiving corresponding ends of said battens, and forming abutments such that in a deployed condition, said ends of said battens transmit axial force to said membrane, thereby tensioning said membrane, said shell occupying a small volume in its folded condition for storage in a launcher for the purpose of being placed into orbit in which said battens store more potential energy than in the deployed condition.

* * * * *